United States Patent [19]

Roper

[11] 4,062,215
[45] Dec. 13, 1977

[54] PROCESS FOR EXPANDING WHEEL COMPONENTS

[75] Inventor: Ralph E. Roper, Indianapolis, Ind.

[73] Assignee: Wallace Expanding Machines, Inc., Indianapolis, Ind.

[21] Appl. No.: 695,109

[22] Filed: June 11, 1976

Related U.S. Application Data

[62] Division of Ser. No. 648,671, Jan. 13, 1976.

[51] Int. Cl.² ............................................. B21D 22/10
[52] U.S. Cl. ...................................... 72/62; 29/159.1; 72/356
[58] Field of Search ...................... 72/62, 356, 63, 58, 72/401, 399, 393, 367; 29/159 R, 159.01, 159.1

[56] References Cited

U.S. PATENT DOCUMENTS

| | | | |
|---|---|---|---|
| 2,972,971 | 2/1961 | Hillgren | 72/356 X |
| 3,129,505 | 4/1964 | Cox | 72/356 X |
| 3,261,315 | 7/1966 | Felten | 72/58 |
| 3,358,489 | 12/1967 | Hutchins | 72/62 |
| 3,397,563 | 8/1968 | Pelton | 72/62 |

Primary Examiner—Leon Gilden
Attorney, Agent, or Firm—Woodard, Weikart, Emhardt & Naughton

[57] ABSTRACT

A process and apparatus for making a metal annular member of precise tolerances. The workpiece is formed by welding sheet metal into a tube. The workpiece is presized by expanding it and plastically stretching it into a precise predetermined annular configuration adapted to closely fit a post element having a pair of spaced annular liquid seals mounted thereon. The post element and workpiece are positioned within an annular lower outer die. A cup-shaped upper outer die is placed over the lower die and is used to compress the post element to squeeze the liquid seals to expand them. Forming of the workpiece is accomplished by pumping liquid into the post element between the liquid seals forcing the workpiece to expand against the outer dies and the sheet metal at the end portions of the workpiece to feed into the part being formed from between the outer dies and the post element.

5 Claims, 7 Drawing Figures

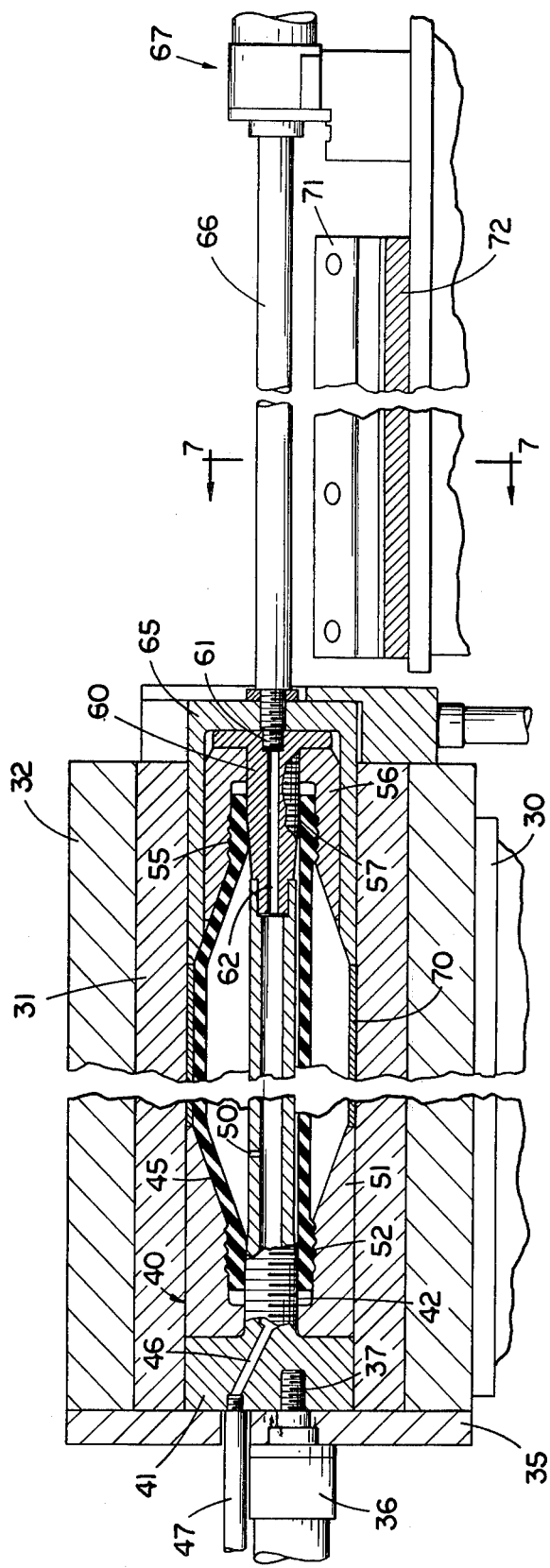
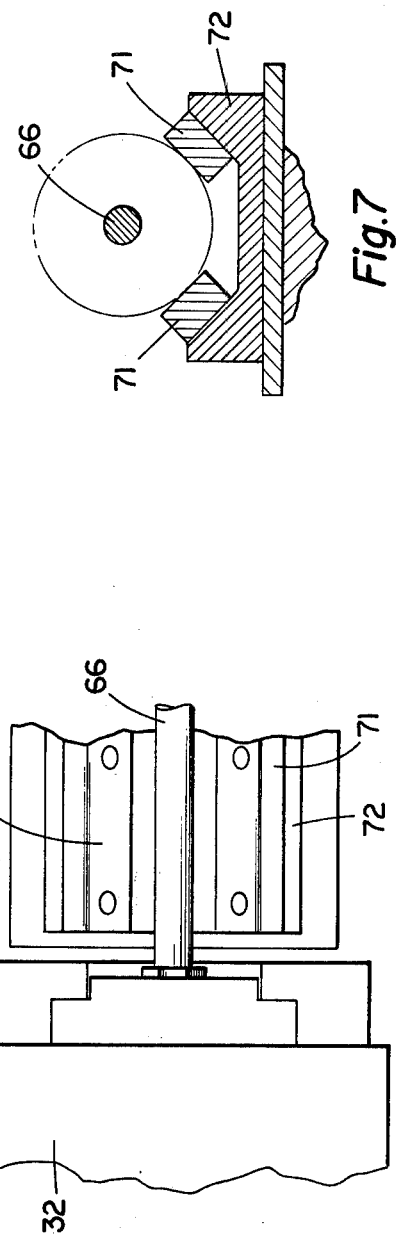
*Fig.5*
*Fig.7*
*Fig.6*

PROCESS FOR EXPANDING WHEEL COMPONENTS

This is a continuation, division, of application Ser. No. 648,671, filed Jan. 13, 1976.

BACKGROUND OF THE INVENTION

1. Field of the Invention:

This invention relates to a method and apparatus for making an annular member of precise tolerances such as can be used in the manufacture of a wheel for a heavy truck.

2. Description of the Prior Art:

One present procedure for making wheels for large trucks involves the casting of the wheels out of steel. The wheels when made in this way are relatively heavy and expensive. It is desirable that an improved procedure for making such wheels be provided, which procedure is less expensive and requires less metal and thus less weight than such casting. One procedure for making barrels which has been used in the production of commercially-used barrels for approximately a year and a half involves the use of fluid as the expanding medium. The workpiece blank is dropped over a post having a pair of spaced annular liquid seals mounted in annular grooves on the post. The seals are expanded radially outwardly by reducing the axial dimension of the annular grooves in which the seals are mounted causing the seals to firmly engage the workpiece blank thereby defining a sealed space bounded by the post, the two annular seals and the workpiece blank.

The workpiece is then expanded by pumping oil under pressure into the space through the post. A radially segmented outer die is used to form the outside configuration of the barrel, the pressurized oil acting to force the workpiece against the radially segmented outer dies. Such barrel making apparatus and procedures are not satisfactory for making heavy truck wheels because the great pressures needed to expand the heavy gauge metal necessary for the wheels has a tendency to radially displace the radially segmented dies used in the barrel manufacture. Furthermore, such radially segmented dies produce segment marks on the workpiece during the expanding process. Also, the substantial pressure necessary to expand the workpiece has a tendency to extrude the annular seals between the post and the outer dies.

The prior art may involve the following U.S. Pat. Nos.: 2,435,306; 2,955,556; 3,102,502; 3,298,218; 3,335,590; 3,391,559; 3,585,828; 3,729,795 and 3,834,212. The patent to Early discloses a procedure for simultaneous expansion and columnar deformation of a workpiece; however, the combining of such procedures is difficult to control as evidenced by the fact that the Early patent is proposing a solution to the problems involved in such control.

SUMMARY OF THE INVENTION

One embodiment of the expanding apparatus of the present invention might involve a post element having a pair of outwardly opening annular recesses therein spaced axially of the post element. Mounted within the recesses are a pair of annular liquid seals which are adapted to provide an annular liquid seal with a workpiece received on the post element. There is also provided a pair of outer dies, one being an upper die for forming the upper portion of the workpiece, and the other being a lower die for forming the lower portion of the workpiece. These outer dies are positioned so as to surround the post element but are spaced a sufficient distance from the post element to permit the top and bottom edge portions of the workpiece to freely move toward one another and to move relative to the post element and the outer dies. There is also provided means for locking the outer dies together to define the outer surface configuration desired for the workpiece. The post element, the seals and the workpiece thereon define a space for receiving liquid under pressure to form the workpiece. There is also provided means for pumping liquid through the post element into the space to cause the workpiece to form against the outer dies and to cause the workpiece edge portions to move between the post element and the outer dies and relative to the post element and outer dies.

One embodiment of the process of the present invention might include providing a metal tubular workpiece and presizing the workpiece by expanding it and thereby plastically stretching it into a precise predetermined annular configuration adapted to closely fit a post element which has a pair of spaced annular outwardly facing recesses with annular liquid seals therein. The presized workpiece is then placed over the post element and surrounding the liquid seals. The annular liquid seals are then expanded to firmly engage and seal off a portion of the inside of the workpiece whereby the workpiece and post element and seals define a sealed space. An outer die surface is then positioned externally of the workpiece, said outer die surface having the desired configuration for the workpiece. Liquid is then pumped under pressure to the sealed space through the post element to cause plastic deformation of the workpiece against the outer die surface to produce the desired product configuration.

Objects of the invention are to provide an improved process and apparatus for making wheel components, to provide a process and apparatus which prevents extrusion of liquid pressure oil seals and avoids the formation of longitudinal segment marks in the workpiece and to provide a process and apparatus for making lighter and less expensive wheel components.

BRIEF DESCRIPTION OF THE DRAWINGS

FIG. 5 is a vertical section through still further expander apparatus forming a part of the present invention.

FIG. 6 is a fragmentary top elevation showing a portion of the structure illustrated in FIG. 5, and FIG. 7 is a section taken along the line 7—7 of FIG. 5 in the direction of the arrows.

DESCRIPTION OF THE PREFERRED EMBODIMENT

Figure 1:
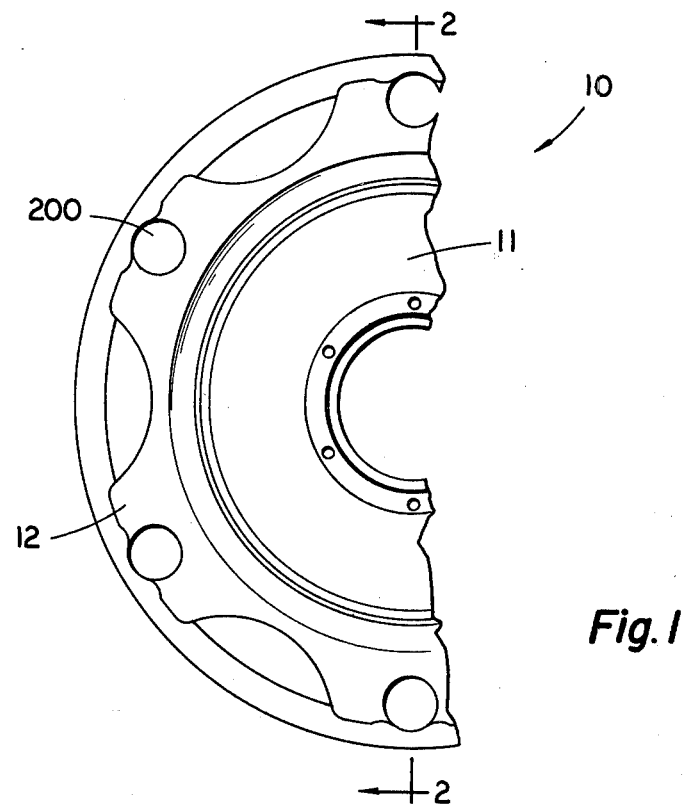
FIG. 1 is a fragmentary side elevation of a heavy truck wheel partially manufactured from the parts made by the use of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
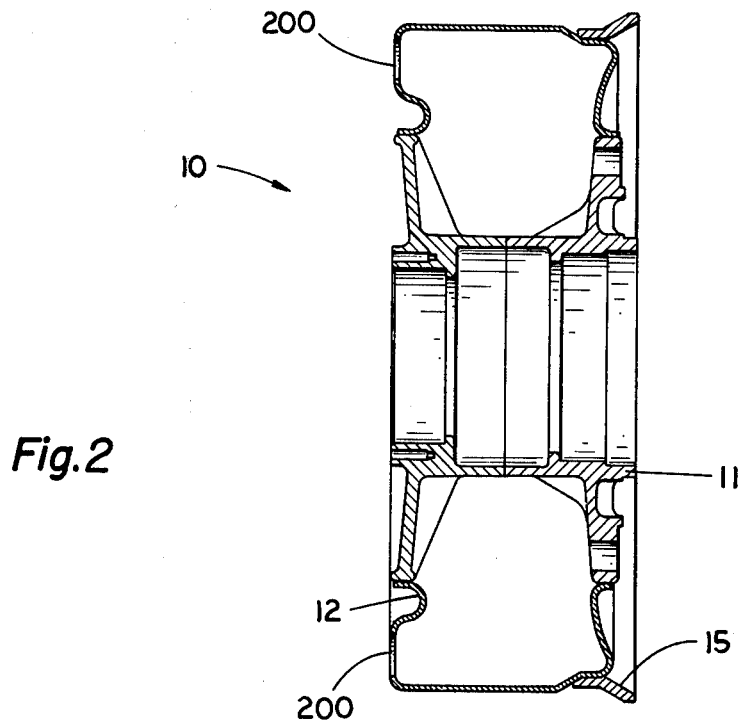
FIG. 2 is a section taken along the line 2—2 of FIG. 1 in the direction of the arrows.

Referring more particularly to FIG. 1 and 2, there is illustrated a truck wheel 10 which includes an inner casting 11 and an annular outer sheet metal part 12 which has a generally C-shaped cross section as illustrated in FIG. 2. In the manufacture of the wheel the part 12 is welded to the casting 11 and a further annular part 15 is fixed to the external surface of the part 12.

In order to form the wheel component 12, sheet metal tubing is constructed by welding together the edges or ends of a piece of sheet metal. The resulting cubing is then placed in the apparatus illustrated in FIGS. 5, 6 and 7 for the purpose of presizing the workpiece. The presizing of the workpiece stretches the workpiece approximately one-half percent so that the workpiece is plastically deformed and assumes a new precise shape for use in the apparatus shown in FIGS. 3, 4, 5 and 6. The presizing apparatus is mounted on a table 30 and includes an outer die 31 fixedly mounted to the table 30 by means of and within the annular part 32. The end of the outer die 31 has fixed thereto closure member 35 which is also fixed to the part 32.

Fixedly mounted to the closure member 35 is a cylinder motor 36, the piston 37 of which is fixed to a bladder assembly 40 and specifically to the member 41 forming a part of that assembly. The member 41 is externally threaded at 42 so as to mount the flexible bladder 45. The bladder 45 is formed of a flexible rubber-like material which may be, for example, a urethane type elastomer. The part 41 also has formed therein a passage 46 which is connected to a pipe 47 for the supply of pressurized oil through the passage 46 and the radially outwardly extending passages 50 into the bladder 45 for expanding the bladder. The bladder is shown in a nonexpanded position in the lower half of the drawing and in an expanded position in the upper half of the drawing.

The bladder assembly 40 further includes a member 51 which is internally ridged at 52 so as to engage and mount the bladder 45 at its leftward end in the member 51. The member 51 is also internally threaded so as to secure the member 51 to the externally threaded member 41, thereby mounting the leftward end of the bladder 45 between the members 41 and 51. The rightward end of the bladder 45 is secured in similar fashion by means of the ridges 55 on the member 56 and the threads 57 on the member 60 to the parts 56 and 60. The bladder assembly further includes a pipe plug 61 which seals off the passage 62 in the member 60.

The apparatus further includes a closure member 65 which is fixedly mounted on the piston 66 of the cylinder motor 67. In order to form the tubular workpiece 70, it is placed in the saddle defined by the parts 71 which are fixed to the member 72 fixed with relation to the outer die 31. The cylinder motor 36 is then operated to project the piston 37 and to project the bladder assembly 40 into the workpiece 70. The piston 66 of the cylinder 67 is then projected forcing the bladder assembly and the member 61 into the external die 31 placing the parts in the position shown in the lower portion of the drawing in FIG. 5. The workpiece is then expanded by inflating the bladder 45 by pumping pressurized oil through the pipe 47 into the passage 46 and through the passage 50 causing the bladder 45 to assume the position shown in the upper portion of FIG. 5. After the forming has been accomplished, the pressurized oil is removed back out the same passages 50, 46 and the pipe 47 permitting the bladder to again resume the position shown in the lower portion of FIG. 5.

Because of the fact that the workpiece has been plastically deformed by the expanding operation and is still under an elastic strain, it decreases in size sufficiently when the bladder deflates so that the workpiece can be ejected from the external die 31. This is accomplished by again projecting the piston 37 of the cylinder motor 36. After the workpiece has been ejected and is positioned on the saddle members 71, the piston 37 of the cylinder motor is retracted, withdrawing the bladder assembly 40 from the inside of the workpiece which is then precisely sized and ready for further operations.

Figure 3:
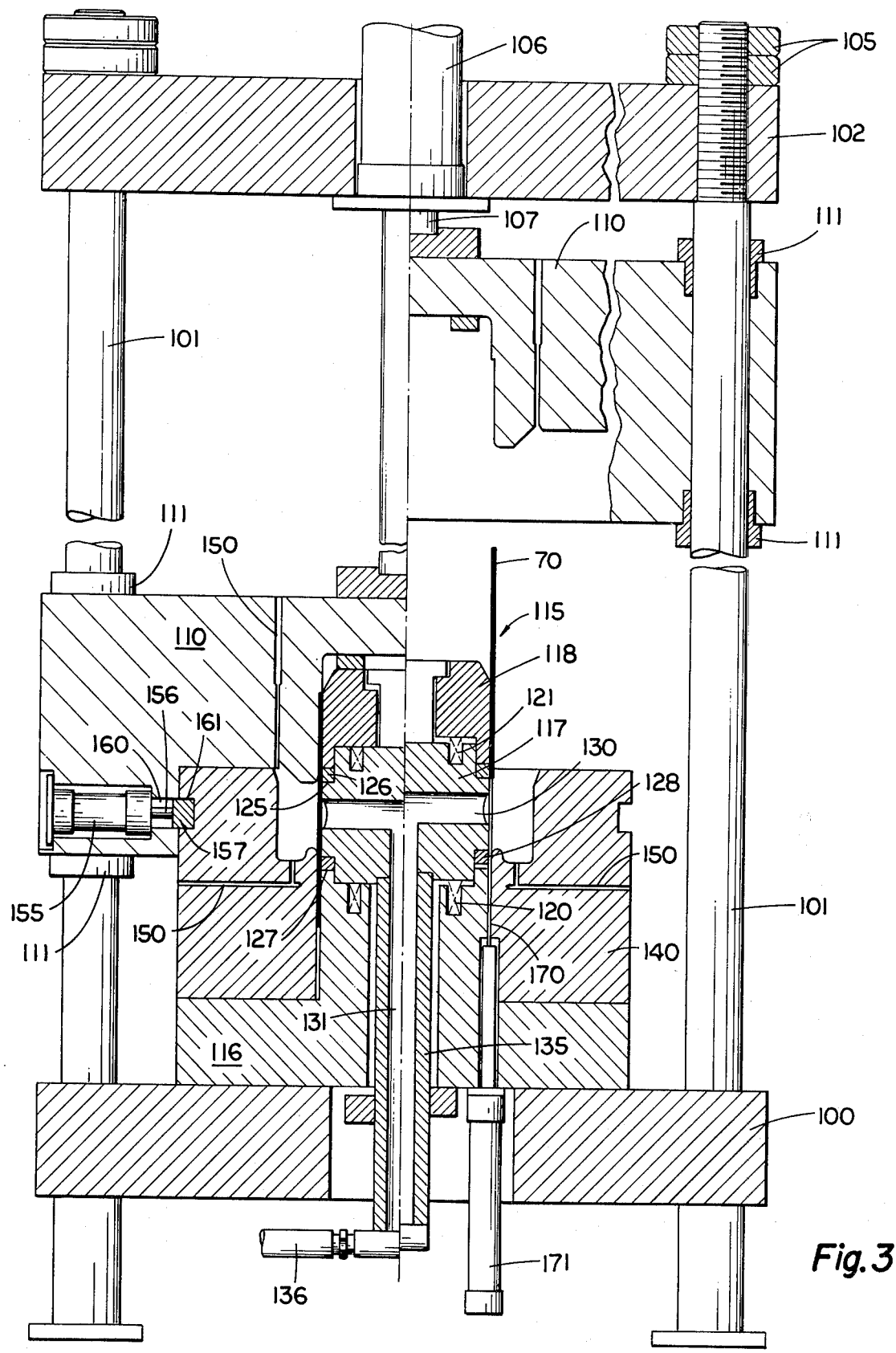
FIG. 3 is a vertical section through expanding apparatus embodying the present invention and showing in the right half of the drawing an initial position of the apparatus and in the left half of the drawing a further position of the apparatus.
Figure 4:
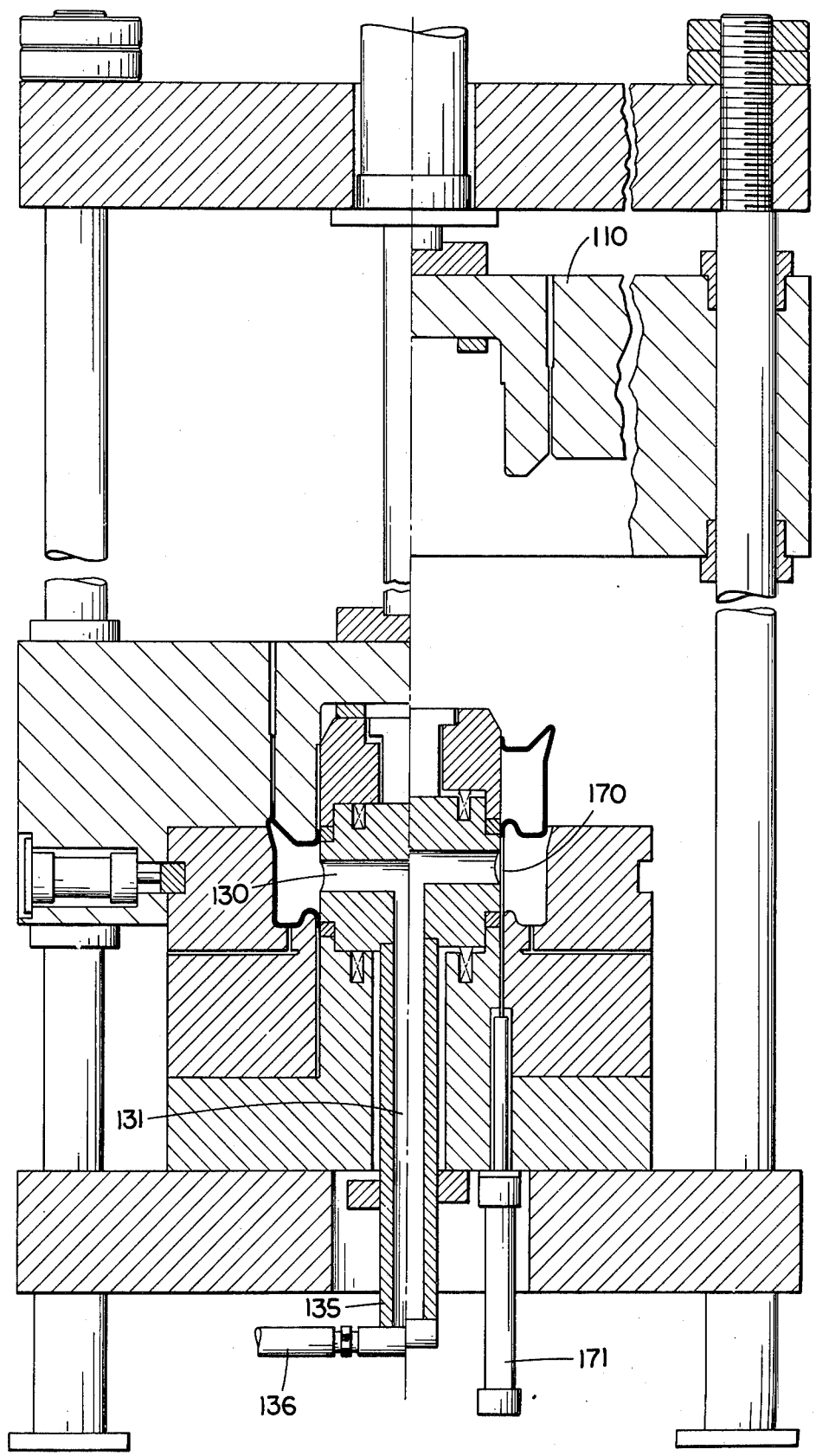
FIG. 4 is a section similar to FIG. 3 but showing still further operating positions of the apparatus in the left-hand and right-hand portions of the drawing.

Referring now to FIGS. 3 and 4, the workpiece 70 after presizing in the structure FIGS. 5, 6 and 7 is placed into the expanding apparatus and the position shown in the right side of FIG. 3. As illustrated, that apparatus includes bed 100 to which are fixed four guide rods 101. At the top of the guide rods 101 is mounted a crown 102 which is fixed in position on the guide rods 101 by means of nuts 105. A lift cylinder motor 106 has a piston 107 fixed to a cup shaped upper outer die 110. The cup shaped upper outer die 110 is slidably mounted by means of bushings 111 on the guide rods 101.

The apparatus further includes a post element 115 which includes three members 116, 117 and 118. The three members 116, 117 and 118 are normally resiliently spaced apart by springs 120 and 121 but can be compressed together so as to firmly contact one another as shown in the left-hand portion of FIG. 3. The two parts 117 and 118 define therebetween a groove 125 within which is received an annular urethane resilient member 126. The members 116 and 117 define therebetween an annular groove 127 within which is received an annular urethane resilient member 128. When the members 116, 117 and 118 of the post element are compressed together to the position shown in the left-hand portion of FIG. 3, the two urethane members 126 and 128 act as liquid seals engaging the workpiece 70 and thereby defining a sealed spaced between the workpiece, the seals 126 and 128 and the member 117 of the post element.

The member 117 has a passage 130 therethrough which connects with a passage 131 also through the member 117 and pipe 135. The pipe 135 is provided with high-pressure oil through a hose 136 which also acts as the oil return. An outer lower die 140 has an annular configuration and is fixedly mounted on the member 116 of the post element 115 in such a position as to be spaced from the member 116 a sufficient distance to allow free movement of the metal of the workpiece within the spacing between the lower outer die 140 and the post element member 116. Both the upper outer die 110 and the lower outer die 140 have air vents 150 therethrough to relieve the air pressure during the forming operation. Mounted on the upper die 110 at four locations are four cylinder motors 155, the pistons of which 156 are connected to shear members 157. It will be noted in the left-hand portion of FIG. 3 that the shear members 157 may be used to lock the upper outer die over and to the lower die 140 by positioning of the shear members 157 in aligned passages 160 and 161 in the upper outer die 110 and the lower die 140.

After the workpiece blank 70 has been placed into the apparatus of FIGS. 3 and 4 as shown in the rightward side of FIG. 3, the pistons 170 of the ejection cylinders 171 are retracted permitting the workpiece 70 to move into the position illustrated in the left-hand side of FIG. 3. The ejection cylinder motors 171 are mounted on the member 116. Next the upper die 116 is moved downwardly into the position shown on the left-hand side of FIG. 3 and is locked in that position by means of the cylinder motors 155 projecting their shear elements 161 to the illustrated blocking positions. It will be noted, therefore, that when the apparatus is in the position of the left-hand side of FIG. 3, the urethane seals 125 and 127 have been squeezed outwardly into engagement with the workpiece blank 70 and the apparatus is in readiness for the expansion step. The squeezing of the urethane seals and compression of the springs 120 and 121 is effected by the engagement of the upper outer die 110 and the annular block 175 connected thereto with the post element 115.

Referring to the left-hand side of FIG. 4, oil under pressure is pumped into the passages 131 and 130 forcing the workpiece to balloon outwardly as illustrated in the left-hand side of FIG. 4 and causing metal from the upper edge portion and the lower edge portion of the workpiece to move into the part as it forms into the outer dies. After the part has been formed, the oil under pressure is caused to flow back outwardly through the passages 130, 131, pipe 135 and 136. Next the upper outer die 110 is raised to the position shown on the right-hand side of FIG. 4, and the part is ejected by operation of the ejection cylinder motors 171. Finally the upper and lower edge portions of the part are trimmed, and the bores 200 are drilled at six locations in the resulting wheel component 12.

It will be evident from the above description that the present invention provides an improved process and apparatus for making wheel components. There is provided a process and apparatus which prevents extrusion of the liquid pressure oil seals 126 and 128. It can also be seen that the present invention avoids the formation of longitudinal segment marks in the workpiece and provides a process and apparatus for making lighter, less expensive wheel components.

The invention claimed is:

1. A process of making an expanded product which comprises:
   a. providing a metal tubular workpiece;
   b. presizing the tubular workpiece by expanding it and thereby plastically stretching it into a precise annular configuration, said presizing being to an extent that the presized tubular workpiece closely fits over a post element which has a pair of spaced annular outwardly facing recesses with annular liquid seals therein;
   c. placing the presized tubular workpiece over a post element having a pair of spaced annular outwardly facing recesses with annular liquid seals therein, said placing being to an extent that the workpiece completely surrounds the annular liquid seals;
   d. expanding the annular liquid seals on the post element to firmly engage and seal off a portion of the inside of the workpiece whereby the workpiece and post element and annular liquid seals define a sealed space;
   e. positioning externally of the workpiece an outer die surface having the desired configuration for the finished workpiece;
   f. and pumping liquid under pressure into the sealed space through a hole in the post element, said pumping being of sufficient force to cause the workpiece to plastically deform outwardly against the outer die surface.

2. The process of claim 1 wherein said presizing is accomplished by placing the tubular workpiece on a flexible bladder and inside a rigid outer die and expanding the bladder by pumping oil under sufficient pressure into the bladder to force the workpiece against the rigid outer die.

3. The process of claim 1 wherein said positioning is accomplished by placing a cup shaped upper die over an annular lower die, the outer dies having mating axially extending walls, and extending a shear pin through the mating axially extending walls thereby locking the upper and lower dies together and completely encasing the workpiece and post element.

4. The process of claim 3 wherein said expanding of the annular liquid seals is accomplished during said placing the upper die over the lower die, said placing additionally comprising axially compressing the post element with sufficient force to reduce the axial dimension of the annular recesses and thereby squeeze the annular liquid seals and expand the seals against the inside wall of the tubular workpiece.

5. The process of claim 4 wherein said positioning and said placing the upper die over the lower die additionally comprise seating the presized tubular workpiece in an annular groove in the outer die surface, the groove being of sufficient width to permit the upper edge portions and the lower edge portions of the workpiece to move toward one another between and relative to the post element and the outer die surface during said pumping.

* * * * *